(12) United States Patent
Hjertberg et al.

(10) Patent No.: US 8,765,843 B2
(45) Date of Patent: Jul. 1, 2014

(54) POLYOLEFIN COMPOSITION FOR MEDIUM/EXTRA/HIGH VOLTAGE CABLES COMPRISING BENZOPHENONE-TYPE VOLTAGE STABILIZER

(75) Inventors: Thomas Hjertberg, Kungshamn (SE); Villgot Englund, Göteborg (SE)

(73) Assignee: Borealis AG, Vienna (AT)

( * ) Notice: Subject to any disclaimer, the term of this patent is extended or adjusted under 35 U.S.C. 154(b) by 422 days.

(21) Appl. No.: 13/059,080

(22) PCT Filed: Jul. 30, 2009

(86) PCT No.: PCT/EP2009/005557
§ 371 (c)(1),
(2), (4) Date: May 9, 2011

(87) PCT Pub. No.: WO2010/028721
PCT Pub. Date: Mar. 18, 2010

(65) Prior Publication Data
US 2011/0220392 A1    Sep. 15, 2011

(30) Foreign Application Priority Data

Sep. 9, 2008    (EP) .................................... 08015869

(51) Int. Cl.
*C08J 3/20* (2006.01)
(52) U.S. Cl.
USPC ............................ 523/351; 524/357; 524/359
(58) Field of Classification Search
USPC .................................. 523/351; 524/357, 359
See application file for complete search history.

(56) References Cited

U.S. PATENT DOCUMENTS

| | | | |
|---|---|---|---|
| 1,787,065 | A | 12/1930 | Calcott et al. |
| 3,482,033 | A | 12/1969 | Kenney et al. |
| 2003/0013780 | A1 | 1/2003 | Lau et al. |

FOREIGN PATENT DOCUMENTS

| | | |
|---|---|---|
| JP | 60-112840 | 6/1985 |
| WO | WO 93/08222 | 4/1993 |
| WO | WO 01/08166 | 2/2001 |

OTHER PUBLICATIONS

International Preliminary Report on Patentability issued Mar. 15, 2011 for International application No. PCT/EP2009/005557.
International Search Report mailed Dec. 18, 2009 for International application No. PCT/EP2009/005557.
Written Opinion mailed Dec. 18, 2009 for International application No. PCT/EP2009/005557.
European Search Report completed Jan. 26, 2009 for Application No. EP 08 01 5869.
Ashcraft, A.C. et al., *Laboratory Studies of Treeing in Solid Dielectrics and Voltage Symposium on Polyethylene*, IEEE, Conference Record of 1976 IEEE International Symposium on Electrical Insulation, Jun. 1976.
Huuva, R. et al., *Development of New Test Set-up for Inverstigation of Electrical Tree Inception in Polyethylene*, Nordic Insulation Symposium, Nord-IS 05, Jun. 2005.
Kuwano, R. et al., *Aqueous Hydroxide as a Base for Palladium-Catalyzed Amination of Aryl Chlorides and Promides*, J. Org. Chem., vol. 67, pp. 6479-6486, 2002.
Huuva, R., *New Test Arrangement for Measuring Electrical Treeing Resistance in Polymers*, Chalmers University of Technology, ISSN: 1652-8891, 2007.
Tanaka, A. et al., *Advanced Power Cable Technology*, vol. I, Basic Concepts and Testing, CPC Press Inc., ISBN: 0-8493-5166-9, 2000.

*Primary Examiner* — Edward Cain
(74) *Attorney, Agent, or Firm* — Fay Sharpe LLP (57) ABSTRACT

The present invention relates to a polyolefin composition comprising (i) a polyolefin (A), (ii) a benzophenone derivative (B) comprising the, preferably consisting of the, structural unit according to the following formula (I): wherein one or more of the Carbon atoms in the phenyl rings to which residue R1, R2, R3, R4, R5, R6, R7, R8, R9 or R10 is attached may also be a heteroatom, such as N, in which case the respective residue R1, R2, R3, R4, R5, R6, R7, R8, R9 or R10 is not present; R1, R2, R3, R4, R5, R6, R7, R8, R9 and R10 independently are hydrogen, or a hydrocarbyl group which may contain heteroatoms; or at least two of said R1, R2, R3, R4, R5, R6, R7, R8, R9 and R10 together with the ring atoms of the ring system of formula (I) they are attached to, form a further aromatic or non-aromatic ring fused to the ring system of formula (I), and wherein the ring system of formula (I) with said at least one fused further ring may further bear one to eight substituents, R1' to R8' each of which are independently selected from said same groups as R1 to R10; and n=1 to 10; with the proviso that (i) at least one of said R1, R2, R3, R4, R5, R6, R7, R8, R9 or R10, or if present, at least one of said R1' to R8', is a hydrocarbyl group which may contain heteroatoms and which contains an amine group.

(I)

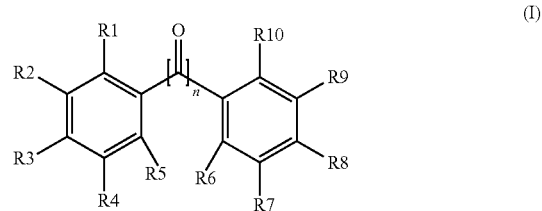

11 Claims, 2 Drawing Sheets

POLYOLEFIN COMPOSITION FOR MEDIUM/EXTRA/HIGH VOLTAGE CABLES COMPRISING BENZOPHENONE-TYPE VOLTAGE STABILIZER

The present invention relates to a polyolefin composition with improved electrical breakdown strength, to a wire or cable, in particular a medium, high or extra high voltage cable, comprising such a composition, and to the use of such a composition for the production of a wire or cable, in particular a medium, high or extra high voltage cable.

A typical medium voltage power cable, usually used for voltages from 6 to 36 kV, a typical high voltage cable used for voltages higher than 36 kV, and a typical extra high voltage cable used for voltages higher than 220 kV, comprises one or more conductors in a cable core that is surrounded by several layers of polymeric materials, including an inner semiconducting layer, followed by an insulating layer, and then an outer semiconducting layer. These layers are normally cross-linked. To these layers, further layers may be added, such as a metallic tape or wire shield, screens, and, finally, outermost jacketing layer(s). The layers of the cable are based on different types of polymer compositions. As insulating materials, today cross-linked polyolefins like cross-linked low density polyethylene are predominantly used.

It is a constant aim of cable manufacturers to increase the electrical breakdown strength of cable materials, in particular cable insulation materials, in order to achieve greater reliability or to develop new cable constructions where the insulation is subjected to higher stress. Defects in the insulation set a limit on the minimum insulation thickness and thereby maximum electrical design stress applied to the cable. To secure high reliability on high stress cable constructions it is known to reduce the amount of contaminants in the insulation material. However, nowadays already super clean materials are used for insulation, and improvements in electrical breakdown strength by further reduction of contaminants are associated with a significant increase in cost.

It is furthermore known to use active additives, namely so called voltage stabilisers, in order to increase the electrical breakdown strength of cable insulation materials. For example, in U.S. Pat. No. 3,482,033 it is disclosed to use a blend of non-volatile hydrocarbon oil of high aromatic content or a highly aromatic, low melting hydrocarbon together with active voltage stabilisers such as polyhalopolyphenyls or nitro-group containing aromatics.

Furthermore, voltage stabilisers are known from WO 01/08166. In this document, voltage stabilisers based on benzophenone as core molecule substituted with alkyl, aryl, alkoxy and aryloxy groups are disclosed.

However, there is still the need for voltage stabilisers which improve the electrical breakdown strength of polyolefin compositions used for medium/high/extra high voltage cable isolation. Such voltage stabiliser compounds should usually have a low ionisation potential to decrease the energy of high energy electrons and hence increase the electrical breakdown strength efficiently (see e.g. A. C. Ashcraft, R. M. Eichhorn, and S.R.G., "Laboratory Studies of Treeing in Solid Dielectrics and Voltage Stabilization of Polyethylene" presented as I.E.E.E. International Symposium on Electrical Insulation, Montreal. Canada, 1976).

At the same time, the compounds must be soluble in the polyolefin, usually cross-linked polyethylene, used as a matrix polymer in the composition, and, furthermore, must show low migration tendency, so that the loss of the compound in the insulation material with time is as low as possible.

Still further, as usually insulating compositions are cross-linked polyolefins, the voltage stabiliser must as far as possible be compatible to commonly used cross-linking agents, such as organic peroxides, so that, on the one hand, the cross-linking process is not negatively affected, and, on the other hand, the voltage stabiliser is not reacting or decomposing which would reduce its efficiency or even, in the worst case, render it inactive. Of course, the voltage stabiliser should also be compatible in this sense with regard to all other components of the polyolefin composition.

It is thus an object, to provide a voltage stabiliser for improving the electrical breakdown strength of a polyolefin composition, especially for the use as an insulating composition in a medium/high/extra high voltage cable, which has the above-mentioned properties, in particular provides a significant improvement in electrical breakdown, has preferably also a good solubility in the polyolefin matrix and a low migration tendency, and more preferably is compatible with regard to other components of the polyolefin composition, in particular to cross-linking agents.

It has now surprisingly been found that the above objects can be achieved by the use of a benzophenone derivative, which comprises one or more substituents at the phenyl groups of the benzophenone molecule comprising an amine group, as a voltage stabiliser compound.

The present invention therefore provides a polyolefin composition comprising
(i) a polyolefin (A),
(ii) a benzophenone derivative (B) comprising the, preferably consisting of the, structural unit according to the following formula (I):

wherein
one or more of the Carbon atoms in the phenyl rings to which residue R1, R2, R3, R4, R5, R6, R7, R8, R9 or R10 is attached may also be a heteroatom, such as N, in which case the respective residue R1, R2, R3, R4, R5, R6, R7, R8, R9 or R10 is not present;
R1, R2, R3, R4, R5, R6, R7, R8, R9 and R10 independently are hydrogen, or a hydrocarbyl group which may contain heteroatoms;
or at least two of said R1, R2, R3, R4, R5, R6, R7, R8, R9 and R10 together with the ring atoms of the ring system of formula (I) they are attached to, form a further aromatic or non-aromatic ring fused to the ring system of formula (I), and wherein the ring system of formula (I) with said at least one fused further ring may further bear one to eight substituents, R1' to R8', each of which are independently selected from said same groups as R1 to R10; and
n=1 to 10;
with the proviso that
(i) at least one of said R1, R2, R3, R4, R5, R6, R7, R8, R9 or R10, or if present, at least one of said R1' to R8', is a hydrocarbyl group which may contain heteroatoms and which contains an amine group.

The term "hydrocarbyl group" denotes any substituent which is composed of carbon and hydrogen atoms regardless of the degree of saturation, e.g. alkyl groups, alkenyl groups, alkinyl groups and aromatic groups composed of C and H. Where it is indicated that a hydrocarbyl group may contain heteroatoms these are atoms different from C and H, such as Si, N, P, O or S, typically N or O.

It has been found that the use of the above compounds as voltage stabiliser yields insulating polyolefin compositions with significantly improved electrical breakdown strength. The improvement in electrical breakdown strength can be seen from the high values of the molar field stability as measured hereinafter. Furthermore, the compounds have a good solubility in the polyolefin matrix and a low migration tendency, and are compatible with the other components of the polyolefin composition, in particular with cross-linking agents.

Preferably, the amine group which according to proviso (i) is contained in said hydrocarbyl group being at least one of said R1, R2, R3, R4, R5, R6, R7, R8, R9 or R10, or if present, at least one of said R1' to R8', is a tertiary amine group. A tertiary amine group, in the following abbreviated as tert.-amine group, is an amine group which carries three hydrocarbyl substituents which may contain heteroatoms at the N-atom.

In an preferred embodiment said at least one of said R1, R2, R3, R4, R5, R6, R7, R8, R9 or R10, or, if present, at least one of said R1' to R8' which according to proviso (i) is a hydrocarbyl group which may contain heteroatoms and which contains an amine group is selected from the groups of —N(R11)(R12) and —Ar—N(R11)(R12), wherein R11 and R12 independently are hydrocarbyl groups which may contain heteroatoms, and Ar is an aryl group which may contain heteroatoms.

Preferably, in the compounds with the structural units according to formula (I) all atoms in the phenyl or naphthyl rings to which a residue R1 to R10 is attached are Carbon atoms.

Furthermore, preferably, R11 and R12, independently are an aryl or alkyl group, more preferably an alkyl group, and still more preferably are a straight alkyl group, which may or may not contain a functional group at the end, which, if present, preferably is a —CH=CH$_2$, a halogen, a hydroxyl, carboxylic acid or acid halide group.

R11 and R12 independently preferably contain at least 2 carbon atoms, more preferably at least 4 carbon atoms, still more preferably contain at least 5 carbon atoms, and most preferably at least 6 carbon atoms.

Furthermore, preferably, R11 and R12 independently contain at most 50 carbon atoms, more preferably at most 30 carbon atoms, still more preferably at most 20 carbon atoms, and most preferably at most 16 carbon atoms.

Ar preferably is a substituted or unsubstituted, preferably unsubstituted, phenyl group.

The number n in formula (I) preferably is 1 to 3, more preferably is 1 or 2, and most preferably is 1.

Furthermore, preferably the compounds comprising, or consisting of, a structural unit according to formula (I) are free of halogen substituents or substituents containing halogen atoms.

It is furthermore preferred that in the structural units according to formula (I) one or two, of R1 to R10, or, if present, R1' to R8' is or are hydrocarbyl groups comprising an amine group in any of the embodiments described before, and the remainder of R1 to R10, or, if present, R1' to R8', are H.

In such cases where two or more of R1 to R10, or, if present, R1' to R8', are hydrocarbyl groups as described, it is preferred that these hydrocarbyl groups are separated by at least one further ring atom, e.g. are located at different phenyl groups or are in meta-position to each other if the two groups are linked to the same phenyl group in the structure of formula (I).

In a first preferred embodiment, the benzophenone derivative (B) comprises, or consists of, a structural unit in which in formula (I) R3 and R8 independently are a N(R11)(R12) group, R1, R2, R4, R5, R6, R7, R9 and R10 are H, and n=1, wherein R11 and R12 have the meaning as defined in any of the embodiments above.

An example for and a preferred embodiment of the benzophenone derivative (B) of the first preferred embodiment is N,N,N',N'-tetraoctyl-benzophenone-4,4' diamine.

In a second preferred embodiment, the benzophenone derivative (B) comprises, or consists of, a structural unit in which in formula (I) R3 is an N(R11)(R12) group, R1, R2, R4, R5, R6, R7, R8, R9 and R10 are H, and n=1, wherein R11 and R12 have the meaning as defined in any of the embodiments above.

An example for and a preferred embodiment of the benzophenone derivative (B) of the second preferred embodiment is N,N-dioctylbenzophenone-4-amine.

It is preferred in all of the above embodiments that the benzophenone derivative (B) consists of the structural unit described for the particular embodiment. However, for all cases where the aromatic system(s) of formula (I) contain at least two substituents, it is also possible that structural units of any of the above described embodiments are made into oligomeric structures, to increase the molecular weight.

It is furthermore possible and also within the scope of the invention to attach the compound (B) to one or more further components of the polyolefin composition of the invention, e.g. to attach it to polyolefin (A).

This may be done by copolymerising voltage stabiliser-containing comonomers and "regular" monomers of e.g. polyolefin (A), or by grafting of suitable voltage stabiliser compounds onto a polymer backbone.

Preferably, compound (B) is present in the composition in an amount of 0.001 to 10 wt %, more preferably 0.01 to 5 wt. %, still more preferably from 0.05 to 4 wt. %, still more preferably 0.1 to 3 wt. %, and most preferably from 0.1 to 2 wt. %.

Polyolefin (A) may be any polyolefin material suitable to be used for the production of a layer of cable, preferably power cable layer, more preferably an insulation layer of a power cable.

Polyolefin (A) preferably comprises, or consists of, a polyethylene or polypropylene. Where herein it is referred to a "polymer", e.g. polyethylene, this is intended to mean both a homo- and copolymer, e.g. an ethylene homo- and copolymer.

Where polyolefin (A) comprises, or consists of, a polyethylene, the polymer may be produced in a high pressure process or in a low pressure process in the presence of a catalyst, for example a chromium, Ziegler-Natta or single-site catalyst, resulting in either unimodal or multimodal polyethylene.

Where polyolefin (A) comprises, or consists of, a polypropylene, this may be a unimodal or multimodal propylene homo- or copolymer and/or a heterophasic polypropylene.

Furthermore, where polyolefin (A) comprises, or consists of, a polypropylene, it is preferred that it has an MFR$_2$ (230° C., 2.16 kg) of from 0.001 to 25 g/10 min.

In a preferred embodiment, polyolefin (A) comprises or consists of an ethylene homo- or copolymer. In the case of an ethylene copolymer, it is preferred that it includes 0.001 to 50 wt.-%, more preferably 0.1 to 40 wt.-%, still more preferably less than 35 wt.-%, still more preferably less than 30 wt.-%, more preferably less than 25 wt-% of one or more comonomers.

Preferably, the density of the ethylene homo or- copolymer is higher than 0.860 g/cm$^3$.

Furthermore, preferably the density of the ethylene homo or- copolymer is not higher than 0.960 g/cm$^3$.

The MFR$_2$ (2.16 kg, 190° C.) of the ethylene homo or-copolymer preferably is from 0.01 to 50 g/10 min, more preferably is from 0.1 to 20 g/10 min, still more preferably is from 0.2 to 15 g/10 min, and most preferably is from 0.2 to 10 g/10 min.

Still further, it is preferred that polyolefin (A) comprises or consists of a polyethylene which has been produced by a high pressure process using free radical polymerization resulting in preferably a low density polyethylene (LDPE). The polymerization generally is performed at pressures of 120 to 350 MPa and at temperatures of 150 to 350° C.

The LDPE may be an ethylene homopolymer or a copolymer of ethylene. As a comonomer in the ethylene copolymer, a non-polar alpha-olefin may be used, either alone or in addition with further types comonomers. Such alpha-olefins may also comprise further unsaturation present e.g. in polyunsaturated comonomers such as dienes.

Preferred non polar alpha olefins are C$_3$-C$_{20}$ alpha olefins, preferably C$_3$ to C$_{10}$ alpha-olefins are used as comonomers, such as propylene, 1-butene, 1-hexene, 4-methyl-1-pentene, styrene, 1-octene, 1-nonene, polyusaturated comonomers preferably C$_8$ to C$_{14}$ non-conjugated dienes, such as a C$_8$ to C$_{14}$ non-conjugated diene, e.g. 1,7-octadiene, 1,9-decadiene, 1,11-dodecadiene, 1,13-tetradecadiene, or any mixture thereof. Further examples of polyunsaturated comonomers are dienes like 7-methyl-1,6-octadiene, 9-methyl-1,8-decadiene, or mixtures thereof can be mentioned.

It is also possible to use polar comonomers, optionally in combination with the non polar alpha olefin comonomer(s). Preferably, as polar monomer units, compounds containing hydroxyl groups, alkoxy groups, carbonyl groups, carboxyl groups, ether, and ester groups are used.

Still more preferably, the polar monomer units are selected from the group of alkyl acrylates, alkyl methacrylates, and vinyl acetates or mixtures therefrom. Further preferred, the comonomers are selected from C$_1$- to C$_6$-alkyl acrylates, C$_1$- to C$_6$-alkyl methacrylates, and vinyl acetate. Still more preferably, the polar copolymer comprises a copolymer of ethylene with C$_1$- to C$_4$-alkyl, such as methyl, ethyl, propyl or butyl acrylates or vinyl acetate, or any mixture thereof.

If polar comonomer units are present in polyolefin (A) it is preferred that the amount is as defined above and below.

If the LDPE is a copolymer, it is preferred that it includes 0.001 to 50 wt.-%, more preferably 0.1 to 40 wt.-%, still more preferably less than 35 wt.-%, still more preferably less than 30 wt.-%, more preferably less than 25 wt.-%, of one or more comonomers.

Polyolefin (A) preferably is cross-linkable. Cross-linking may be achieved e.g. by further including a cross-linking agent into the composition or by the incorporation of cross-linkable groups into polyolefin (A).

In a preferred embodiment, the polymer composition according to the present invention further comprises a cross-linking agent.

In the context of the present invention, a cross-linking agent is defined to be any compound capable to generate radicals which can initiate a cross-linking reaction. Preferably, the cross-linking agent contains at least one —O—O— bond or at least one —N=N— bond.

The cross-linking agent, e.g. a peroxide, is preferably added in an amount of less than 10 wt %, more preferably 0.1 to 5.0 wt. %, still more preferably 0.1 to 3.0 wt. %, even more preferably 0.15 to 2.6 wt. %, based on the weight of the cross-linkable polymer composition.

As peroxides as non-limiting examples of cross-linking agents are i.a. di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, bis(tertbutylperoxyisopropyl) benzene, butyl-4,4-bis(tert-butylperoxy)-valerate, 1,1-bis(tert-butylperoxy)-3,3,5-trimethylcyclohexane, tert-butylperoxybenzoate, dibenzoylperoxide, 2,5-dimethyl-2,5-di(benzoylperoxy)hexane, 1,1-di(tert-butylperoxy)cyclohexane, 1,1-di(tert amylperoxy)cyclohexane, or any mixtures thereof.

Preferably, the peroxide is selected from 2,5-di(tert-butylperoxy)-2,5-dimethyl-hexane, di(tert-butylperoxy-isopropyl)benzene, dicumylperoxide, tert-butylcumylperoxide, di(tert-butyl)peroxide, or mixtures thereof. Most preferably, the peroxide is dicumylperoxide.

It is preferred that cross-linking is effected by including a cross-linking agent, such as a peroxide in any of the above mentioned embodiments, into the composition.

However, cross-linking may also be achieved by hydrolysable silane groups which may be present in polyolefin (A). Thus, polyolefin (A) may also comprise or consist of a cross-linkable polyolefin containing hydrolysable silane groups. Hydrolysable silane groups are typically crosslinked by a condensation catalyst in the presence of water.

The hydrolysable silane groups may be introduced into the polyolefin by copolymerisation of e.g. ethylene monomers with silane group containing comonomers or by grafting, i.e. by chemical modification of the polymer by addition of silane groups mostly in a radical reaction. Both techniques are well known in the art.

In case Polyolefin (A) comprises or consists of an unsaturated polyolefin, i.e. a polyolefin comprising carbon-carbon double bonds, then preferably the polyolefin has a total amount of carbon-carbon double bonds/1000 carbon atoms of 0.1 or more, more preferably of 0.2 or more, still more preferably of 0.3 or more, and most preferably more than 0.37.

The upper limit of the amount of carbon-carbon double bonds present in the polymer is not limited and may preferably be less than 5.0/1000 carbon atoms, preferably less than 3.0/1000 carbon atoms, or more preferably less than 2.5/1000 carbon atoms.

When used in combination with the unsaturated polyolefin, the term "total amount of carbon-carbon double bonds" refers to those double bonds originating from vinyl groups, vinylidene groups and trans-vinylene groups. The amount of each type of double bond is measured as indicated in the experimental part.

The incorporation of the total amount of carbon-carbon double bonds within the polyolefin component enables to accomplish improved cross-linking properties.

The total amount of vinyl groups is preferably higher than 0.02/1000 carbon atoms, more preferably higher than 0.05/1000 carbon atoms, still more preferably higher than 0.08/1000 carbon atoms, and most preferably higher than 0.11/1000 carbon atoms.

Preferably, the total amount of vinyl groups is lower than 4.0/1000 carbon atoms.

Preferred unsaturated polyolefin (A) is an unsaturated polyethylene or an unsaturated polypropylene. More preferably, the unsaturated polyolefin is an unsaturated polyethylene and more preferably an unsaturated homo or copolymer or even more preferably an unsaturated LDPE homo or copolymer.

Preferably, the unsaturated polyolefin is prepared by copolymerising at least one olefin monomer with at least one polyunsaturated comonomer.

In a preferred embodiment, the polyunsaturated comonomer consists of a straight carbon chain with at least 8 carbon atoms and at least 4 carbon atoms between the non-conjugated double bonds, of which at least one is terminal.

Siloxanes having the following formula:

wherein $n=1$ or higher can also be used as a polyunsaturated comonomer. As an example, divinylsiloxanes, e.g. alpha,omega-divinylsiloxane, can be mentioned.

In addition to the polyunsaturated comonomer, further comonomers can optionally be used, preferably non polar $C_3$-$C_{20}$ alpha olefin comonomers, more preferably $C_3$ to $C_{10}$ alpha-olefin comonomers without further unsaturation, such as propylene, 1-butene, 1-hexene, 4-methyl-1-pentene, styrene, 1-octene, and/or 1-nonene, polar comonomers or any mixture thereof.

It is also possible to use polar comonomers, optionally in combination with the non polar alpha olefin comonomer(s). Preferably, as polar monomer units, compounds containing hydroxyl groups, alkoxy groups, carbonyl groups, carboxyl groups, ether, and ester groups are used.

Still more preferably, the polar monomer units are selected from the group of alkyl acrylates, alkyl methacrylates, and vinyl acetates or mixtures therefrom. Further preferred, the comonomers are selected from $C_1$- to $C_6$-alkyl acrylates, $C_1$- to $C_6$-alkyl methacrylates, and vinyl acetate. Still more preferably, the polar copolymer comprises a copolymer of ethylene with $C_1$- to $C_4$-alkyl, such as methyl, ethyl, propyl or butyl acrylates or vinyl acetate, or any mixture thereof.

If polar comonomer units are present in polyolefin (A) it is preferred that the amount is as defined above.

When preparing the unsaturated polyolefin such as an unsaturated polyethylene in a high pressure process, the polymerisation is generally performed at pressures in the range of 120 to 350 MPa and at temperatures in the range of 150 to 350° C.

The polyolefin can be unimodal or multimodal, e.g. bimodal.

In a preferred embodiment, the polyolefin (A) as polyethylene or the preferably unsaturated polyethylene contains at least 50 wt-% ethylene monomer units.

Polyethylene, or preferably unsaturated polyethylene, of low density is preferred.

In addition to the components polyolefin (A) and aromatic compound (B), the polymer composition may further comprise components, which may, for example, be any type of other polymer.

In one embodiment, the polymer composition of the invention further comprises a polar copolymer (C).

Polar copolymers (C) preferably are olefin copolymers, more preferably propylene or ethylene copolymers containing polar comonomers preferably the ones defined above.

Preferably, the polymer composition further comprises a scorch retarder. In the context of the present invention, a "scorch retarder" is defined to be a compound that reduces the formation of scorch during extrusion of a polymer composition, at typical extrusion temperatures used, if compared to the same polymer composition extruded without said compound. Besides scorch retarding properties, the scorch retarder may simultaneously result in further effects like boosting, i.e. enhancing cross-linking performance during the cross-linking step.

Preferred scorch retarders are unsaturated dimers of aromatic alpha-methyl alkenyl monomers, such as 2,4-di-phenyl-4-methyl-1-pentene, substituted or unsubstituted diphenylethylene, quinone derivatives, hydroquinone derivatives, monofunctional vinyl containing esters and ethers, monocyclic hydrocarbons having at least two or more double bonds, or mixtures thereof. More preferably, the scorch retarder is selected from 2,4-diphenyl-4-methyl-1-pentene, substituted or unsubstituted diphenylethylene, or mixtures thereof.

Preferably, the amount of scorch retarder is within the range of 0.005 to 1.0 wt.-%, more preferably within the range of 0.01 to 0.8 wt.-%, based on the weight of the cross-linkable polyolefin composition. Further preferred ranges are 0.03 to 0.75 wt-%, 0.05 to 0.70 wt-% and 0.05 to 0.50 wt-%, based on the weight of the cross-linkable polyolefin composition.

The polymer composition may contain further additives, such as antioxidant(s), stabiliser(s), processing aid(s), and/or cross-linking booster(s). As antioxidant, sterically hindered or semi-hindered phenols, aromatic amines, aliphatic sterically hindered amines, organic phosphates, thio compounds, and mixtures thereof, can be mentioned.

Typical cross-linking boosters may include compounds containing at least 1, preferably at least 2, unsaturated groups, e.g. vinyl or an allyl groups, such as an aliphatic or aromatic compound, an ester, an ether, or a ketone, which contains at least 1, preferably at least 2, unsaturated group(s), such as a cyanurate, an isocyanurate, a phosphate, an ortho formate, an aliphatic or aromatic ether, or an allyl ester of benzene tricarboxylic acid. Examples of esters, ethers and ketones are compounds selected from general groups of diacrylates, triacrylates, tetraacrylates, triallylcyanurate, triallylisocyanurate, or any mixtures thereof. having a, e.g. triallylcyanurate, triallylisocyanurate, and di-, tri- or tetra-acrylates.

As further additives, flame retardant additives, acid scavengers, inorganic filler(s), preferably selected from carbon black or flame retardant filler, water-tree retardant(s) and other voltage stabiliser(s) can be mentioned.

If an antioxidant, optionally a mixture of two or more antioxidants, is used, the added amount can range from 0.005 to 2.5 wt-%, based on the weight of the polymer composition.

In general, if a polyethylene is used in the composition, the antioxidant(s) are preferably added in an amount of 0.005 to 1.5 wt-%, more preferably, 0.01-1.2 wt-%, even more preferably 0.04 to 0.80 wt-%, based on the weight of the polymer composition.

Similarly, if a polypropylene is used in the composition, the antioxidant(s) are preferably added in an amount of 0.005 to 2 wt-%, more preferably 0.01 to 1.5 wt-%, even more preferably 0.05 to 1 wt-%, based on the weight of the polymer composition.

Further additive(s) may be present in an amount of 0.001 to 5 wt %, more preferably 0.005 to 3 wt %, and still more preferably 0.005 to 2 wt %, based on the weight of the polymer composition. Flame retardant additives and inorganic fillers can be added in higher amounts.

If used for semiconductive layers, the composition may comprise carbon black in usual amounts, preferably in an amount of from 10 to 60 wt %, more preferably from 20 to 50 wt %.

The $MFR_2$ (2.16 kg, 190° C.) of the polymer composition preferably is from 0.01 to 50 g/10 min, more preferably is from 0.1 to 20 g/10 min, and most preferably is from 0.2 to 10 g/10 min when no inorganic filler is present.

The polyolefin (A) and the compound (B), optionally in combination with one or more optional additives discussed above, can be blended by any conventional blending technique to result in the polymer composition of the invention.

The polymer composition preferably contains carbon-carbon double bonds in an amount of at least 0.1/1000 carbon atoms, or preferably at least 0.2/1000 carbon atoms or more preferred 0.30/1000 carbon atoms. The upper limit of the amount of carbon-carbon double bonds present in the polymer composition is not limited and may preferably be of less than 5.0/1000 carbon atoms, preferably of less than 3.0/1000 carbon atoms, or more preferably of less than 2.5/1000 carbon atoms.

The total amount of double bonds of the cross-linkable polymer composition is based on vinyl, vinylidene and trans-vinylene groups/1000 carbon atoms of component (A) and/or any further components in the polymer composition comprising such groups.

C—C double bonds present in the polymer composition include vinyl groups and the total amount of said vinyl groups is, in the given preference order, of at least 0.02/1000 carbon atoms, at least 0.05/1000 carbon atoms, at least 0.08/1000 carbon atoms, at least 0.10/1000 carbon atoms, or of at least 0.11/1000 carbon atoms.

The upper limit of the total amount of the vinyl groups present in the polymer composition is typically, in the given preference order, of up to 4.0/1000 carbon atoms, of up to 3.0/1000 carbon atoms, up to 2.5/1000 carbon atoms, or of up to 2.0/1000 carbon atoms.

Accordingly, the total amount the vinyl groups, if present, contributes to the total amount of C—C double bonds present in the polymer composition. The total amount of vinyl groups can e.g. consist of any the above mentioned vinyl groups from the polymer and, if present, added other additives such as boosters, scorch retarders or other further additive(s).

From the polymer composition described above, a cross-linked composition can be prepared by blending with a cross-linking agent, followed by treatment under cross-linking conditions, thereby increasing the cross-linking level. Cross-linking can be effected by treatment at increased temperature, e.g. at a temperature of at least in the range of 150-160° C. When peroxides are used, cross-linking is generally initiated by increasing the temperature to the decomposition temperature of the corresponding peroxide. When the peroxide decomposes, radicals are generated from the peroxide. These radicals then initiate the cross-linking reaction.

The total amount of additive(s) in the polyolefin composition according to the invention is generally 0.05 to 15 wt. %, preferably 0.1 to 12 wt. %, more preferably 0.1 to 10 wt. %.

From the polymer composition of the present invention, a multilayered article can be prepared wherein at least one layer comprises said polymer composition. When cross-linking is initiated, a cross-linked multilayered article is obtained. Preferably, the multilayered article (either cross-linked or not) is a cable, preferably a power cable.

In the context of the present invention, a power cable is defined to be a cable transferring energy operating at any voltage. The voltage applied to the power cable can be alternating (AC), direct (DC), or transient (impulse).

In a preferred embodiment, the multilayered article is a power cable operating at voltages higher than 1 kV. In other preferred embodiments, the power cable prepared according to the present invention is operating at 6 kV or higher.

The power cable can be prepared in a process wherein the composition of the present invention, optionally in combination with a cross-linking agent, is applied onto a substrate by extrusion. In such an extrusion process, the sequence of mixing the components of the composition can be varied, as explained below.

According to a preferred embodiment, the polyolefin (A), optionally in combination with other polymer component(s), and the compound (B) are mixed with each other and possibly with further additive(s), either on solid pellets or powder of the different polymer components or by melt mixing, followed by forming pellets from the melt.

Subsequently, if used, the cross-linking agent, preferably a peroxide, and optionally a scorch retarder and/or a cross-linking booster are added to the pellets or powder in a second step. Alternatively, the scorch retarder and/or cross-linking booster could already be added in the first step, together with the additives. The final pellets are fed to the extruder, e.g. a cable extruder.

According to another preferred embodiment, instead of a two-step process, the polyolefin (A) and any further polymeric component(s) of the composition, preferably in the form of pellets or powder, compound (B) and, optionally, the further additives, cross-linking agent, and/or scorch retarder, are added to a compounding extruder, single or twin screw. Preferably, the compounding extruder is operated under careful temperature control.

According to another preferred embodiment, a mix of component (B) with all other additives, i.e. including antioxidant (s) and cross-linking agent and optionally a scorch retarder and/or further additives such as a cross-linking booster, are added onto the pellets or powder made of the polyolefin (A) and optionally other polymer component(s).

According to another preferred embodiment, pellets made of the polyolefin (A) and compound (B), optionally further containing further polymeric components and additional further additive(s), are prepared in a first step, e.g. by melt mixing. These pellets, obtained from the melt mixing, are then fed into the cable extruder. Optionally, subsequently, cross-linking agent and optionally a scorch retarder and/or a cross-linking booster are either fed prior to the hopper, in the hopper or directly into the cable extruder and optionally together with further polymeric components if they have not been added in the first step. Alternatively, cross-linking agent and/or scorch retarder and/or cross-linking booster are already added to the pellets before feeding these pellets into the cable extruder or only the crosslinking agent is added prior to the hopper, in the hopper or directly in the cable extruder if all other components already have been added in earlier step(s).

According to another preferred embodiment, pellets made of the polyolefin (A) and any further polymeric component(s) without any additional further component(s) are fed to the extruder. Subsequently, component (B) and optionally antioxidant(s), cross-linking agent(s) and optionally a scorch retarder, optionally in combination further additive(s) such as a cross-linking booster, are either fed in the hopper or directly fed into the polymeric melt within the cable extruder. The compound (B) could be added in this step instead, together with the antioxidant(s), cross-linking agent, scorch retarder and the other optional additives used. Alternatively, one or more of these components, i.e. cross-linking agent, scorch retarder, cross-linking booster, antioxidant(s), compound (B) or a mixture of these components is already added to the pellets before feeding these pellets into the cable extruder, e.g. the components not already present in the fed pellets that should be present in the cable needs to be added at any position in the cable extrusion step.

According to another preferred embodiment, the compound (B) can also be provided in a master batch which comprises at least a matrix polymer and the compound (B). Compound (B) could also be present in the pellets and antioxidant (s), crosslinking agent etc could be added in one or more masterbatches.

The master batch is then added to or mixed with the polyolefin (A) and possibly further polymer components and further processed in a known manner to produce an article, such as power cable.

When producing a power cable by extrusion, the polymer composition can be applied onto the metallic conductor and/or at least one coating layer thereof, e.g. a semiconductive layer or insulating layer. Typical extrusion conditions are mentioned in WO 93/08222.

Compounding may be performed by any known compounding process, including extruding the final product with a screw extruder or a kneader.

The present invention furthermore relates to a wire or cable, comprising the polyolefin composition in any of the above described embodiments.

In a preferred embodiment, the invention relates to a medium, high or extra high voltage cable comprising one or more conductors in a cable core, an inner semiconducting layer, followed by an insulating layer, and then an outer semiconducting layer, wherein at least one of these layers, preferably the insulating layer, comprises the polyolefin composition as described above.

The term "conductor" means herein above and below that the conductor comprises one or more wires. Moreover, the cable may comprise one or more such conductors. Preferably the conductor is an electrical conductor.

One or more of those layers may also be cross-linked.

In addition to the semiconductive and insulating layers, further layers may be present in medium, high or extra high voltage cables, such as a metallic tape or wire shield, screen(s) and, finally, outermost jacketing layer(s).

The invention relates furthermore to the use of the polyolefin composition in any of the above described embodiments for the production of a layer of a wire or cable, preferably of a layer, more preferably an insulating layer, of a medium, high or extra high voltage cable.

Still further, the present invention relates to a polyolefin composition comprising a voltage stabiliser compound and having a molar field stability of at least 7500 kV kg/(mm mol), more preferably of at least 10000 kV kg/(mm mol), still more preferably at least 12000 kV kg/(mm mol), and most preferably at least 15000 kV kg/(mm mol), measured in the electrical tree testing method described below.

Preferred embodiments of this polyolefin composition are those comprising the above described components (A), polyolefin (A) and (B) in any of their above-described embodiments and amounts.

Finally, the invention relates to the use, as a voltage stabiliser in a polyolefin composition, of a benzophenone derivative (B) comprising the, preferably consisting of the, structural unit according to the following formula (I):

wherein
one or more of the Carbon atoms in the phenyl rings to which residue R1, R2, R3, R4, R5, R6, R7, R8, R9 or R10 is attached may also be a heteroatom, such as N, in which case the respective residue R1, R2, R3, R4, R5, R6, R7, R8, R9 or R10 is not present;

R1, R2, R3, R4, R5, R6, R7, R8, R9 and R10 independently are hydrogen, or a hydrocarbyl group which may contain heteroatoms;

or at least two of said R1, R2, R3, R4, R5, R6, R7, R8, R9 and R10 together with the ring atoms of the ring system of formula (I) they are attached to, form a further aromatic or non-aromatic ring fused to the ring system of formula (I), and wherein the ring system of formula (I) with said at least one fused further ring may further bear one to eight substituents, R1' to R8', each of which are independently selected from said same groups as R1 to R10; and n=1 to 10;

with the proviso that (i) at least one of said R1, R2, R3, R4, R5, R6, R7, R8, R9 or R10, or if present, at least one of said R1' to R8', is a hydrocarbyl group which may contain heteroatoms and which contains an amine group.

The following examples serve to further illustrate the present invention, by reference to the figures.

EXAMPLES

Figure 1:
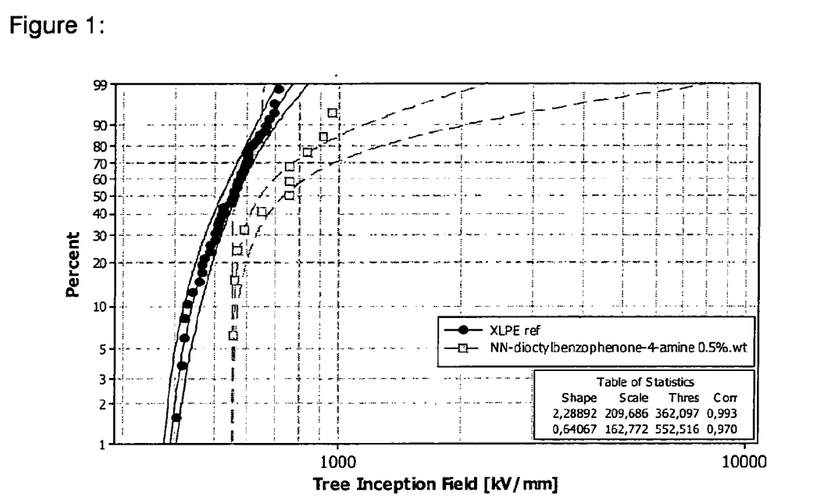
FIG. 1: Results of the electrical testing of the composition of Example 1.
Figure 2:
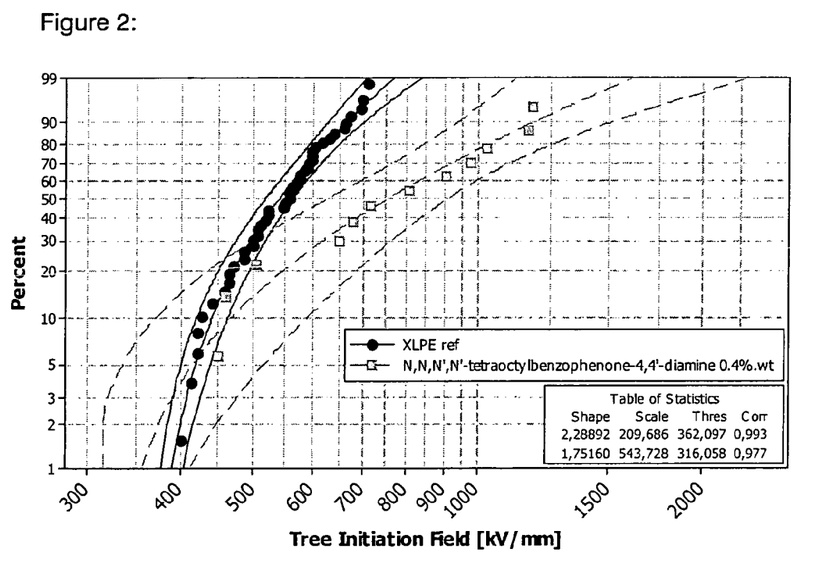
FIG. 2: Results of the electrical testing of the composition of Example 2.
Figure 3:
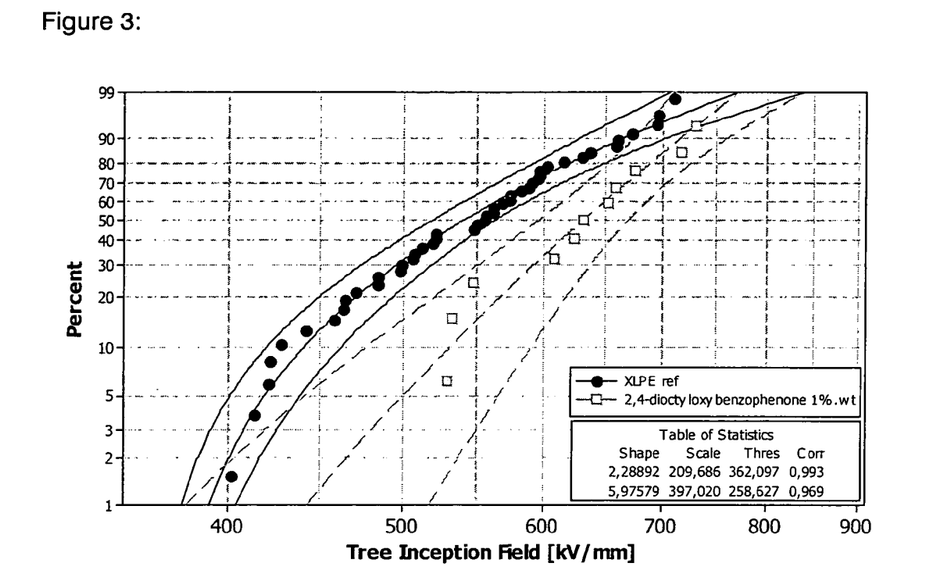
FIG. 3: Results of the electrical testing of the composition of Comparative Example 2.

1. Measurement Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$). The MFR is determined at 230° C. for polypropylenes.

b) Determination of the Amount of Double Bonds

The procedure for the determination of the amount of double bonds/1000 Carbon atoms is based upon the ASTM D3124-72 method. In that method, a detailed description for the determination of vinylidene groups/1000 Carbon atoms is given based on 2,3-dimethyl-1,3-butadiene. The described sample preparation procedure has also been applied for the determination of vinyl groups/1000 Carbon atoms, vinylidene groups/1000 Carbon atoms and trans-vinylene groups/1000 Carbon atoms in the present invention. However, for the determination of the extinction coefficient for these three types of double bonds, the following three compounds have been used: 1-decene for vinyl, 2-methyl-1-heptene for vinylidene and trans-4-decene for trans-vinylene, and the procedure as described in ASTM-D3124 section 9 was followed.

The total amount of double bonds was analysed by means of IR spectrometry and given as the amount of vinyl bonds/1000 carbon atoms, vinylidene bonds/1000 carbon atoms and trans-vinylene bonds/1000 carbon atoms, respectively.

Thin films were pressed with a thickness of 0.5-1.0 mm. The actual thickness was measured. FT-IR analysis was performed on a Perkin Elmer 2000. Four scans were recorded with a resolution of 4 cm$^{-1}$.

A base line was drawn from 980 cm$^{-1}$ to around 840 cm$^{-1}$. The peak heights were determined at around 888 cm$^{-1}$ for vinylidene, around 910 cm$^{-1}$ for vinyl and around 965 cm$^{-1}$ for trans-vinylene. The amount of double bonds/1000 carbon atoms was calculated using the following formulas:

vinylidene/1000 Carbon atoms=(14×$A$)/(18.24×$L$×$D$)

vinyl/1000 Carbon atoms=(14×$A$)/(13.13×$L$×$D$)

trans-vinylene/1000 Carbon atoms=(14×$A$)/(15.14×$L$× $D$)

wherein
A: absorbance (peak height)
L: film thickness in mm
D: density of the material (g/cm$^3$)

c) Determination of the Vinyl Content Originating from the Polyunsaturated Compound The amount of vinyl groups originating from the polyunsaturated comonomer per 1000 carbon atoms was determined and calculated as follows:

The polymer to be analysed and a reference polymer have been produced on the same reactor, basically using the same conditions, i.e. similar peak temperatures, pressure and production rate, but with the only difference that the polyunsaturated comonomer is added to polymer to be analysed and not added to reference polymer. The total amount of vinyl groups of each polymer was determined by FT-IR measurements, as described above. Then, it is assumed that the base level of vinyl groups, i.e. the ones formed by the process and from chain transfer agents resulting in vinyl groups (if present), is the same for the reference polymer and the polymer to be analysed with the only exception that in the polymer to be analysed also a polyunsaturated comonomer is added to the reactor. This base level is then subtracted from the measured amount of vinyl groups in the polymer to be analysed, thereby resulting in the amount of vinyl groups/1000 carbon atoms, which result from the polyunsaturated comonomer.

d) Electrical Tree Testing

The tree field is obtained by a wire-plane electrode configuration (R. Huuva, V. Englund, S. M. Gubanski, et al., "Development of New Test Set-up for Investigation of Electrical Tree Inception in Polyethylene," presented at Nordic Insulation Conference, Trondheim, 2005; "New Test Arrangements for Measuring Electrical Treeing Resistance in Polymers", Huuva R., Chalmers University of Technology, ISSN: 1652-8891). The test object is then connected to an AC high voltage source prior to being submerged in transformer oil. The voltage is ramped with 0.5 kV/s until electrical treeing is achieved. The entire course of events is recorded with a CCD camera that allows both a visual real time analysis and a later computer analysis using the commercially available program package Adobe Premiere Pro to determine the tree inception field. Testing is done at ambient temperature and humidity.

By applying a Kruskal Wallis test to the data sets, where cross-linked reference material and the same material with the different voltage stabilisers added, it is seen that the material with voltage stabiliser added were separated from the reference material to an extent ranging from 99.7 to 99.9%. This means that the two data sets are significantly separated.

e) Density

Density of the polymer was measured according to ISO 1183/D.

2. Compositions Produced and Tested a) Production of Voltage Stabilisers

Unless otherwise specified all the reagents are commercially available or can be produced according to methods well known in the literature.

i) Synthesis of N,N-dioctylbenzophenone-4-amine 4-bromobenzophenone (1.94 g, 7.4 mmol), potassium hydroxide (0.66 g, 11.8 mmol), cetyl-trimethylammonium-bromide (0.0204 g, 0.056 mmol) and bis(tri-tert-butylphosphine)palladium(0) (0.051 g, 0.10 mmol) was added to a flask which was evacuated and refilled with nitrogen three times. To the flask nitrogen bubbled toluene (10 ml) and water (2.1 ml) was added, and then dioctylamine (4.20 g, 17.4 mmol) was added drop wise. The reaction mixture was refluxed for 20 h and then quenched with water. The mixture was extracted with dichloromethane three times, washed with brine two times, dried and evaporated to yield a yellow oil. The oil was purified using gradient chromatography (petroleum ether, then dichloromethane and finally chloroform) which gave the desired product as a yellow oil (2.73 g, 73%).

Maldi[m/z]: 421.20
NMR [H, deltaCDCl3]: 0.87 (6H, t), 1.20-1.35 (20H, m), 1.61 (4H, m), 3.33 (4H, t), 6.60 (2H, d), 7.44 (2H, t), 7.50 (1H, m), 7.71 (2H, d), 7.77 (2H, d)

ii) Synthesis of N,N,N',N'-tetraoctylbenzophenone-4,4'-diamine 4,4'-dibromobenzophenone (1.97 g, 5.8 mmol), potassium hydroxide (1.04 g, 18.5 mmol), cetyl-trimethylammonium-bromide (0.032 g, 0.088 mmol) and bis(tri-tert-butylphosphine)palladium(0) (0.076 g, 0.15 mmol) was added a flask which was evacuated and refilled with nitrogen three times. To the flask nitrogen bubbled toluene (10 ml) and water (2.1 ml) was added, and then dioctylamine (6.00 g, 25.0 mmol) was added drop wise. The reaction mixture was refluxed for 24 h and then quenched with water. The mixture was extracted with toluene three times, washed with brine two times, dried and evaporated to yield a yellow oil. The oil was purified using flash chromatography (toluene) to yield the desired product (1.08 g, 28%) as a yellow oil.

Maldi[m/z]: 660.40
NMR[H, deltaCDCl3]: 0.89 (12H, t), 1.20-1.45 (40H, m), 1.59 (8H, m), 3.32 (8H, t), 6.60 (4H, d), 7.74 (4H, d)

Both syntheses are based on the following reference;
R. Kuwano, M. Utsunomiya, and J. F. Hartwig, "Aqueous Hydroxide as a Base for Palladium-Catalyzed Amination of Aryl Chlorides and Bromides," J. Org. Chem., vol. 67, pp. 6479-6486, 2002.

b) Production and Testing of Compositions

Several compositions including voltage stabilisers for the preparation of insulating layers were prepared and tested together with a reference polymer without voltage stabiliser according to the following procedures:

Material and Test Set Up for Electrical Tree Testing

In each test for general definitions and for examples of this application the test arrangement for the reference polymer, i.e. the polymer without the voltage stabilizing compounds to be tested, and for the tested compositions, i.e. the reference polymer containing the voltage stabilizing compounds, was the same.

A commercially available cross-linkable low density polyethylene (LDPE) with a grade name, Supercure™ LS4201S, supplied by Borealis, Sweden, which was prepared by high pressure polymerization and had a density of 0.922 g/cm$^3$ (ISO1872-2/ISO1183-2), $MFR_2$ (ISO 1133, load 2.16 kg, at 190° C.) of 2 g/10 min was used as the polymer for preparing the compositions to be tested, and also as the reference polymer.

The reference polymer was in a form of pellets which contained dicumyl peroxide as a cross-linking agent. The electrode support was made of cross-linked semi-conducting polyethylene. The electrode used was a 10 micrometer tungsten wire supplied by Luma Metall AB.

Sample Preparation for Electrical Tree Testing

Impregnation

The reference polymer pellets for electrical tree testing were ground to a fine powder in a Retsch grinder with a 500 micrometer sieve. For the preparation of the compositions according to the invention (Examples 1 and 2) and the preparation of the comparative compositions (Comparative Example 1 and 2), the powder obtained was impregnated with the respective test voltage stabiliser in a dichloromethane solution for one hour while agitated every 15 minutes. The dichloromethane was then removed by means of rotary evaporation and vacuum oven to obtain a dry powder with a homogeneously distributed voltage stabiliser.

The following compounds were used in the tested compositions as voltage stabilisers in the indicated amounts based on the total composition:

Example 1

N,N-dioctylbenzophenone-4-amine 0.5 wt. %

Example 2

N,N,N',N'-tetraoctylbenzophenone-4,4'-diamine 0.4 wt. %

Comparative Example 1

N-octyl-carbazole 2 wt. %

Comparative Example 2

2,4-dioctyloxybenzophenone 1 wt. %

Preparation of Test Objects

The test object used here is comprised of a 10 micrometer tungsten wire sawn to an electrode support made of cross-linked semi-conducting polyethylene. This is molded between two plaques of the compositions or the reference material to be tested. These plaques are subsequently cross-linked.

The dimensions, molding and cross-linking of the plaques are as follows: The electrode support is 40 mm long and 10 mm wide with both ends rounded at a radius of 5 mm. The wire is sawn to make a loop where the high and divergent field is produced. The electrode and its support are molded between two plaques of cross-linkable polyethylene, with or without an addition of voltage stabiliser using a two piece mold which holds the electrode support in place during the whole molding process. The test objects are made in batches of 10.

The molding scheme for the plaques is 6 minutes at 130° C., the first 3 minutes at 2 kN and the last 3 minutes at 200 kN before cooling to room temperature with sustained pressure during approximately 15 minutes. The molding/cross-linking cycle of the test objects starts at 2 kN for 3 minutes and goes from 2 kN to 200 kN over 18 minutes with a load increase rate of 11 kN/min and is withheld at 200 kN for the rest of the duration of the molding/cross-linking cycle. During the molding cycle the temperature is set at 130° C. at the beginning of the cycle and at this temperature for the first six minutes after which it increases to 180° C. during 15 minutes with a temperature increase rate of 3.3° C./min and stays at 180° C. for 15 minutes for completing the cross-linking of the molded plaques before descending to room temperature over a period of approximately 30 minutes. The insulation part of the test object will be 1.6 mm×20 mm×approx. 30 mm after cutting depending on the wire loop.

c) Results

1. Electrical Tree Testing

The compositions prepared as well as the reference polymer were subjected to the electrical tree testing as described above to obtain values for their Molar Field Stability (MFS).

Molar Field Stability is a way to describe the efficiency of a voltage stabiliser with reference to the material in which it is added. The efficiency is the combined increase of the threshold and scale parameter taken from the 3 parameter Weibull statistics (Advanced Power Cable Technology, Tanaka T., Greenwood A., CRC Press Inc., 1983, ISBN: 0-8493-51 66-9) correlated to the concentration of added voltage stabiliser and can be described as follows:

$$((\text{Threshold}+\text{Scaleparameter})_{VoltageStabiliser} - (\text{Threshold}+\text{Scaleparameter})_{Reference})/(\text{mole}_{VoltageStabiliser}/\text{kg}_{Polymer})$$

This is also applicable when using 2 parameter Weibull statistics where the scale parameter is used, leading to the expression:

$$(\text{Scaleparameter}_{VoltageStabiliser} - \text{Scaleparameter}_{Reference})/(\text{mole}_{VoltageStabiliser}/\text{kg}_{Polymer})$$

In the above equations the subscript "voltage stabiliser" indicates that the parameter was obtained from a sample in which the reference polymer has been impregnated with the respective voltage stabilisers, i.e. from one of the tested compositions, whereas the subscript "reference" indicates that the parameter was obtained from a sample of the reference polymer not including a voltage stabiliser.

Molar Field Stability is a modification of Molar Voltage Stability which has been used when using double needle setups where a characteristic voltage usually was obtained.

The values for the Molar Field Stability obtained are given in Table 1 (calculated based on the 3 parameter Weibull statistics):

TABLE 1

| Example | Molar Field Stability kV kg/(mm mol) |
|---|---|
| Example 1 | 16100 |
| Example 2 | 50000 |
| Comparative Example 1 | 1247 |
| Comparative Example 2 | 3430 |

The invention claimed is:

1. A polyolefin composition comprising:
   (i) a polyolefin (A),
   (ii) a benzophenone derivative (B) comprising the structural unit according to the following formula (I):

wherein
one or more of the carbon atoms in the phenyl rings to which residue R1, R2, R3, R4, R5, R6, R7, R8, R9 or R10 is attached may also be a heteroatom, in which case the respective residue R1, R2, R3, R4, R5, R6, R7, R8, R9 or R10 is not present; R1, R2, R3, R4, R5, R6, R7, R8, R9 and R10 independently are hydrogen, or a hydrocarbyl group which may contain heteroatoms;
or at least two of said R1, R2, R3, R4, R5, R6, R7, R8, R9 and R10 together with the ring atoms of the ring system of formula (I) they are attached to, form a further aromatic or non-aromatic ring fused to the ring system of formula (I), and wherein the ring system of formula (I) with said at least one fused further ring may further bear one to eight substituents, R1' to R8', each of which are independently selected from said same groups as R1 to R10; and
n=1 to 10;
with the proviso that
(i) at least one of said R1, R2, R3, R4, R5, R6, R7, R8, R9 or R10, or if present, at least one of said R1' to R8', is a hydrocarbyl group selected from —N(R11)(R12) and —Ar—N(R11)(R12), wherein R11 and R12 are independently an aryl or alkyl group which contains from 4 to 30 carbon atoms, and Ar is an aryl group which may contain heteroatoms.

2. Polyolefin composition according to claim 1 wherein R11 and R12 independently are a straight alkyl group, which may or may not contain a functional group at the end.

3. Polyolefin composition according to claim 1 wherein R11 and R12 independently contain from 5 to 20 carbon atoms.

4. Polyolefin composition according to claim 1 wherein n in formula (I) is 1 or 2.

5. Polyolefin composition according claim 4 wherein n in formula (I) is 1.

6. A master batch comprising:
   (i) a matrix polymer in an amount of 50 wt. % or more, and
   (ii) a benzophenone derivative (B) comprising the structural unit according to the following formula (I):

wherein
one or more of the carbon atoms in the phenyl rings to which residue R1, R2, R3, R4, R5, R6, R7, R8, R9 or R10 is attached may also be a heteroatom, in which case the respective residue R1, R2, R3, R4, R5, R6, R7, R8, R9 or R10 is not present; R1, R2, R3, R4, R5, R6, R7, R8, R9 and R10 independently are hydrogen, or a hydrocarbyl group which may contain heteroatoms;
or at least two of said R1, R2, R3, R4, R5, R6, R7, R8, R9 and R10 together with the ring atoms of the ring system of formula (I) they are attached to, form a further aromatic or non-aromatic ring fused to the ring system of formula (I), and wherein the ring system of formula (I) with said at least one fused further ring may further bear one to eight substituents, R1' to R8', each of which are independently selected from said same groups as R1 to R10; and
n=1 to 10;
with the proviso that
(i) at least one of said R1, R2, R3, R4, R5, R6, R7, R8, R9 or R10, or if present, at least one of said R1' to R8', is a hydrocarbyl group selected from —N(R11)(R12) and —Ar—N(R11)(R12), wherein R11 and R12 are independently an aryl or alkyl group which contains from 4 to 30 carbon atoms, and Ar is an aryl group which may contain heteroatoms.

7. A cable comprising a layer made of a polyolefin composition according to claim 1.

8. Cable according to claim 7 wherein the cable is a medium, high or extra high voltage cable comprising an inner semiconductive layer, an insulating layer and an outer semiconductive layer.

9. Cable according to claim 8 wherein at least the insulating layer is made of a polyolefin composition according to claim 1.

10. Cable according to claim 6 which is a medium, high or extra high voltage cable.

11. A method for improving the voltage stability of a polyolefin composition comprising:
   adding a benzophenone derivative (B) to the polyolefin composition, the benzophenone derivative (B) comprising the structural unit according to the following formula (I):

wherein
one or more of the carbon atoms in the phenyl rings to which residue R1, R2, R3, R4, R5, R6, R7, R8, R9 or R10 is attached may also be a heteroatom, in which case the respective residue $R_1$, $R_2$, $R_3$, $R_4$, $R_5$, $R_6$, $R_7$, $R_8$, $R_9$ or $R_{10}$ is not present;
$R_1$, $R_2$, $R_3$, $R_4$, $R_5$, $R_6$, $R_7$, $R_8$, $R_9$ and $R_{10}$ independently are hydrogen, or a hydrocarbyl group which may contain heteroatoms;
or at least two of said $R_1$, $R_2$, $R_3$, $R_4$, $R_5$, $R_6$, $R_7$, $R_8$, $R_9$ and $R_{10}$ together with the ring atoms of the ring system of formula (I) they are attached to, form a further aromatic or non-aromatic ring fused to the ring system of formula (I), and wherein the ring system of formula (I) with said at least one fused further ring may further bear one to eight substituents, $R_1'$ to $R_8'$, each of which are independently selected from said same groups as $R_1$ to $R_{10}$; and
n=1 to 10;
with the proviso that
(i) at least one of said $R_1$, $R_2$, $R_3$, $R_4$, $R_5$, $R_6$, $R_7$, $R_8$, $R_9$ or $R_{10}$, or if present, at least one of said $R_1'$ to $R_8'$, is a hydrocarbyl group selected from —N($R_{11}$)($R_{12}$) and —Ar—N($R_{11}$)($R_{12}$), wherein $R_{11}$ and $R_{12}$ are independently an aryl or alkyl group which contains from 4 to 30 carbon atoms, and Ar is an aryl group which may contain heteroatoms.

\* \* \* \* \*